United States Patent
Park et al.

(10) Patent No.: US 9,588,584 B2
(45) Date of Patent: Mar. 7, 2017

(54) SYSTEM AND METHOD FOR PROCESSING TOUCH INPUT

(71) Applicants: Chong-Sil Park, Seoul (KR); Sang-Hee Park, Seoul (KR)

(72) Inventors: Chong-Sil Park, Seoul (KR); Sang-Hee Park, Seoul (KR)

( * ) Notice: Subject to any disclaimer, the term of this patent is extended or adjusted under 35 U.S.C. 154(b) by 297 days.

(21) Appl. No.: 14/337,817

(22) Filed: Jul. 22, 2014

(65) Prior Publication Data

US 2015/0033122 A1    Jan. 29, 2015

(30) Foreign Application Priority Data

Jul. 25, 2013 (KR) .................. 10-2013-0088121

(51) Int. Cl.
G06F 3/01 (2006.01)
G06F 3/0488 (2013.01)

(52) U.S. Cl.
CPC ............ G06F 3/016 (2013.01); G06F 3/0488 (2013.01)

(58) Field of Classification Search
CPC ...... G06F 3/016; G06F 3/0481; G06F 3/0482; G06F 3/0488; G06F 3/04883
USPC ................. 715/702, 810; 345/173
See application file for complete search history.

(56) References Cited

U.S. PATENT DOCUMENTS

| | | | | |
|---|---|---|---|---|
| 2006/0046031 | A1* | 3/2006 | Janevski ............... | G06F 3/016 428/195.1 |
| 2010/0017710 | A1* | 1/2010 | Kim ..................... | G06F 3/0414 715/702 |
| 2012/0249439 | A1* | 10/2012 | Kawate ............... | G06F 3/04886 345/173 |
| 2013/0254714 | A1* | 9/2013 | Shin ..................... | G06F 3/0488 715/810 |

FOREIGN PATENT DOCUMENTS

| | | |
|---|---|---|
| KR | 10-2011-0075700 A | 7/2011 |
| KR | 10-2012-0001302 A | 1/2012 |
| KR | 10-2012-0010283 A | 2/2012 |
| KR | 10-2012-0079929 A | 7/2012 |

* cited by examiner

*Primary Examiner* — Haoshian Shih
(74) *Attorney, Agent, or Firm* — Rabin & Berdo, P.C.

(57) ABSTRACT

A system and method for processing a touch input. The system includes a touch screen configured to detect a touch on a touch screen panel, an outputter configured to output at least one of a vibration and a sound, a press sensor configured to detect user's pressing the touch screen panel by more than a predetermined strength, and a controller configured to, when the touch is detected where a user interface icon is displayed, control the outputter to output at least one of the vibration and the sound corresponding to the user interface icon, and, when a press on the touch screen panel is detected within a predetermined time after the touch is detected, perform a job corresponding to the user interface icon of location where the touch is detected.

10 Claims, 6 Drawing Sheets

SYSTEM AND METHOD FOR PROCESSING TOUCH INPUT

PRIORITY

This application claims priority under 35 U.S.C. §119 to an application filed in the Korean Intellectual Property Office on Jul. 25, 2013 and assigned Serial No. 10-2013-0088121, the contents of which are incorporated herein by reference.

BACKGROUND OF THE INVENTION

1. Field of the Invention

The present invention relates to a system and method for processing a touch input, and more particularly, to a system and method for processing a touch input, which can distinguish between a touch input and a press input of a user and process the input.

2. Description of the Related Art

A touch screen refers to a screen which is able to directly receive input data so that, when a user's hand or an object touches a character or a specific location on the screen without using a keyboard, the touch screen can grasp the touch location and perform a specific process by using a software element stored therein. The touch screen is widely used as an input interface of a user terminal such as a mobile phone, a computer, a navigation device, etc.

According to a general input method of the touch screen, a corresponding job is performed at the moment that the user touches the screen. Therefore, the user should visually identify contents displayed on the touch screen beforehand.

However, when the user manipulates a navigation screen while driving a car, the user may not look ahead while visually identifying formation on the touch screen and thus is likely to cause an accident. When the user performs a touch manipulation without seeing contents of the touch screen, the user may perform an unintended touch input and have difficulty in manipulating the touch screen.

In particular, a blind person cannot visually identify the contents displayed on the touch screen and thus cannot use the touch screen. For example, an Automatic Teller Machine (ATM) has a means for facilitating the user input with a voice, but it is difficult for the blind person to select an icon displayed on the touch screen and input exactly. Therefore, the merits of the touch screen using the intuitive input method are not well utilized and an extra device for blind persons is redundantly provided.

A related-art touch screen method is limited to two operations, a "touch" gesture of bringing an inputting means such as a user's hand in contact with the touch screen, and a "release" gesture of raising the inputting means away from the touch screen. Korean Patent Publication No. 2012-0079929 discloses the technology of conducting an interface command by combining a touch input through a touch screen and a button input through a physical button, and representing physical button feedback. However, this method requires the user to visually identify information displayed on the touch screen beforehand in order to input a touch.

SUMMARY OF THE INVENTION

An aspect of the present invention is to solve at least the above-mentioned problems and/or disadvantages and to provide at least the advantage described below. Accordingly, an aspect of the present invention is to provide a system and method for processing a touch screen input, which enables a user to input an intended touch exactly even when the user cannot visually identify contents of a touch screen.

According to an aspect of the present invention, a method for processing a touch input includes: (a) detecting a touch on a touch screen panel; (b) when the touch is detected where a user interface icon is displayed, outputting at least one of a vibration and a sound corresponding to the user interface icon; and (c) when the touch screen panel is pressed by more than a predetermined strength within a predetermined time after the touch is detected, performing a job corresponding to the user interface icon displayed on the location where the touch is detected.

The vibration and the sound may be set differently according to each user interface icon.

The method may further include determining whether to execute a dual input mode, and, when the dual input mode execution is selected by the user, the operations (a) to (c) may be performed.

The decision whether to execute the dual input mode may include: detecting a touch in a standby state; outputting a message inquiring whether to execute the dual input mode; and when the touch screen panel is pressed by more than a predetermined strength, determining that the dual input mode execution is selected.

The operation (b) may include, when security is set for an input through the user interface icon, blocking the output of the sound and outputting only the vibration.

According to another aspect of the present invention, a system for processing a touch input includes: a touch screen configured to detect a touch on a touch screen panel; an outputter configured to output at least one of a vibration and a sound; a press sensor configured to detect user's pressing the touch screen panel by more than a predetermined strength; and a controller configured to, when the touch is detected where a user interface icon is displayed, control the outputter to output at least one of the vibration and the sound corresponding to the user interface icon, and, when a press on the touch screen panel is detected within a predetermined time after the touch is detected, perform a job corresponding to the user interface icon of location where the touch is detected.

When dual input mode execution is not selected by a user, the controller may directly perform the job corresponding to the user interface icon of the location where the touch is detected, and when the dual input mode execution is selected by the user, the controller may output at least one of the vibration and the sound corresponding to the user interface icon of the location where the touch is detected, and, when the touch screen panel is pressed by more than the predetermined strength, the controller may perform the job corresponding to the user interface icon of the location where the touch is detected.

When a touch is detected in a standby state, the controller may output a message inquiring whether to execute the dual input mode, and, when the touch screen panel is pressed by more than a predetermined strength, the controller may determine that the dual input mode execution is selected.

When security is set for an input through the user interface icon, the controller may output only the vibration among the sound and the vibration corresponding to the user interface icon.

The press sensor may include a physical button which is disposed on a lower portion of the touch screen panel.

The press sensor may include a pressure sensor which is disposed on a lower portion of the touch screen panel.

According to still another aspect of the present invention, a computer readable medium records a program for executing the above-described method in a computer.

According to various exemplary embodiments, the user can exactly input an intended touch when the user cannot visually identify contents of the touch screen. In addition, when the user selects an icon on the touch screen to perform a job by using a physical button as a press sensing means, the user may feel as if the user really presses the button.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Exemplary embodiments of the present invention will be described herein below with reference to the accompanying drawings. In the following description, detailed descriptions of well-known functions or configurations will be omitted since they would unnecessarily obscure the subject matters of the present invention. Also, the terms used herein are defined according to the functions of the present invention. Thus, the terms may vary depending on users' or operators' intentions or practices. Therefore, the terms used herein should be understood based on the descriptions made herein.

Figure 1:
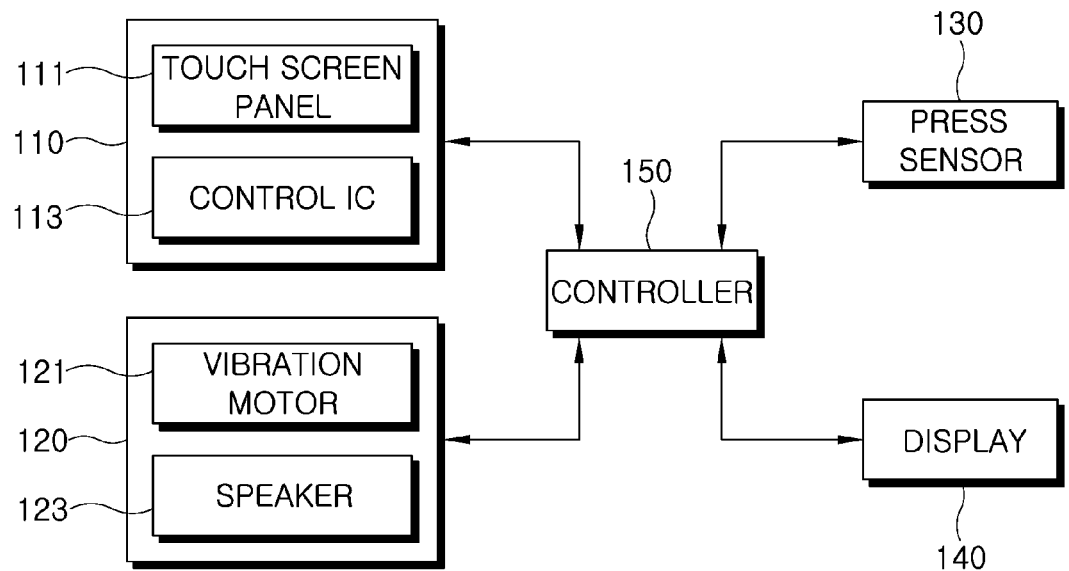
FIG. 1 is a block diagram illustrating a configuration of a touch screen input processing system according to an exemplary embodiment of the present invention.
Figure 2A:
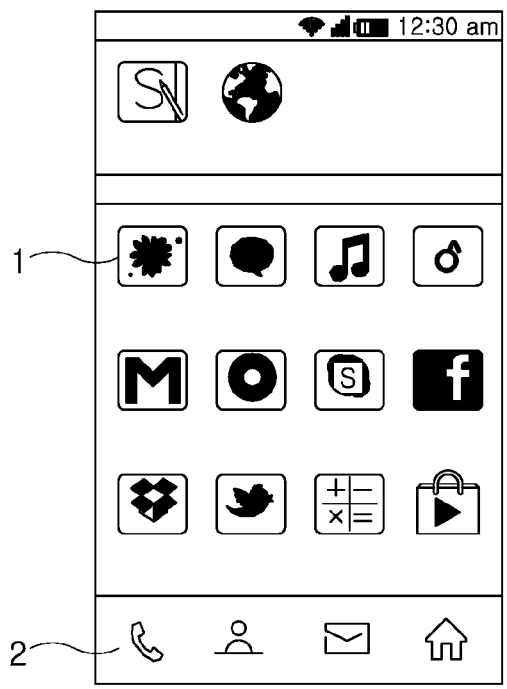
FIGS. 2A and 2B are views to illustrate a user interface icon according to an exemplary embodiment of the present invention.
Figure 2B:
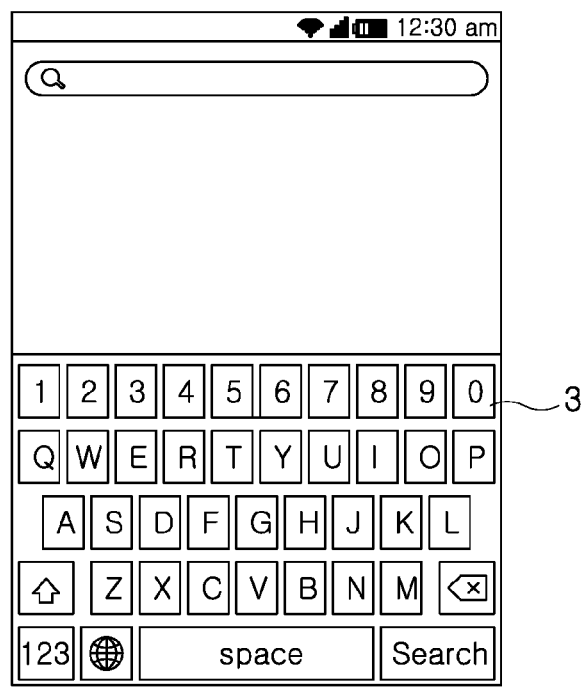
Figure 3A:
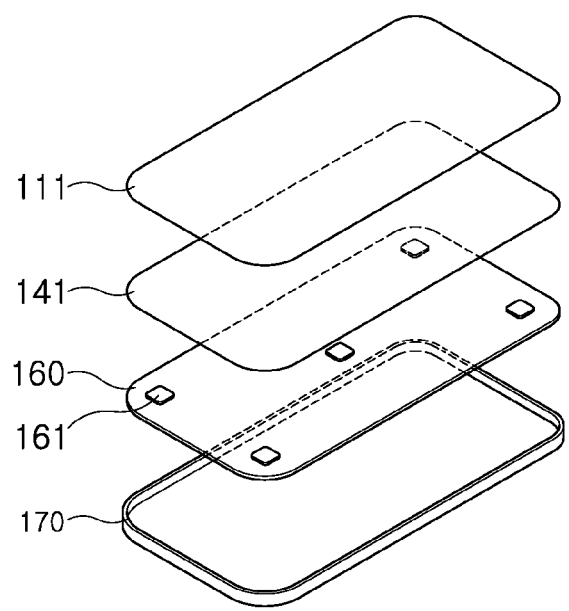
FIGS. 3A and 3B are views illustrating arrangements of a touch screen panel and a press sensor in a touch screen input processing system according to an exemplary embodiment of the present invention.
Figure 3B:
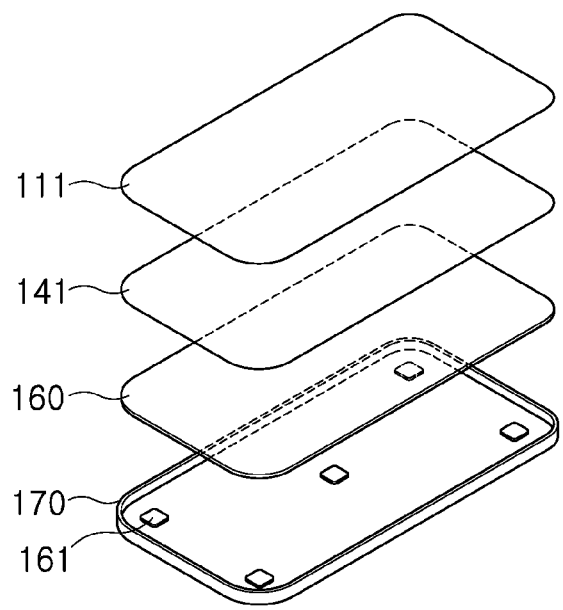

FIG. 1 is a block diagram illustrating a configuration of a touch screen input processing system according to an exemplary embodiment of the present invention, FIGS. 2A and 2B are views to illustrate a user interface icon according to an exemplary embodiment of the present invention, and FIGS. 3A and 3B are views illustrating arrangements of a touch screen panel and a press sensor in a touch screen input processing system according to an exemplary embodiment of the present invention.

The touch screen input processing system 100 may be implemented by using an information communication terminal supporting a touch screen input method, such as a smartphone, a tap book, a navigation device, an automatic teller machine (ATM), etc.

The touch screen input processing system 100 may include a touch screen 110, an outputter 120, a press sensor 130, a display 140, and a controller 150.

The touch screen 110 may detect a touch which is input by an in putting means such as a user's finger, a stylus pen, etc., and may transmit coordinates of a location where the touch is detected to the controller 150. To achieve this, the touch screen 110 may include a touch screen panel 111 and a control Integrated Circuit (IC) 113. The touch screen panel 1121 performs a function of detecting a touch of a user's finger or a stylus pen, and the control IC 113 performs a function of transmitting a touch detecting signal including information on the coordinates of the location where the touch is detected to the controller 150.

The outputter 120 may include a vibration motor 121 and/or a speaker 123. The vibration motor 121 may output a vibration under the control of the controller 140. The speaker 123 may output a sound under the control of the controller 150.

The press sensor 130 performs a function of outputting a press detecting signal to the controller 150 when user's pressing the touch screen panel by more than a predetermined strength is detected.

The display 140 performs a function of displaying a screen related to a job performed in the touch screen input processing system 100 under the control of the controller 150, and may include a display panel (not shown) such as a Liquid Crystal Display (LCD), an Organic Light Emitting Diode (OLED), etc.

The screen displayed on the display 140 may include user interface icons 1, 2, and 3 as shown in FIGS. 2A and 2B. The user interface icons 1, 2, and 3 recited herein refer to things that perform an interface function for the touch screen input processing system 100 to receive a user command to perform a specific job.

For example, as shown in FIG. 2A, the icon 1 performs an interface function to receive a command to execute an application installed in the touch screen input processing system 100 from the user, and the icon 2 performs an interface function to receive a user command to perform a specific job designated in the touch screen input processing system 100 such as calling, finding an address list, sending a message, moving to a home screen, and the like. In addition, as shown in FIG. 2B, the icon 3 may perform an interface function to receive a user command to input characters or numbers.

The controller 150 controls an overall operation of the touch screen input processing system 100. In particular, according to an exemplary embodiment, the controller 150 may control the touch screen input processing system 100 to operate as follows when a dual input mode is executed.

When a touch is detected where a user interface icon is displayed, the controller 150 may control the outputter 120 to output at least one of a vibration and a sound corresponding to the user interface icon, and when a press on the touch screen panel 111 is detected within a predetermined time after the touch is detected, the controller 150 may control the touch screen input processing system 100 to perform a job corresponding to the user interface icon of the location where the touch is detected.

Referring to FIGS. 3A and 3B, the press sensor 130 is disposed in a location where it can detect the user's pressing the touch screen panel 111 by more than a predetermined strength. The press sensor 130 may be disposed on a lower portion of the touch screen panel 111. As shown in FIG. 3A, the press sensor 130 may be disposed between the display panel 141 disposed on the lower portion of the touch screen panel 111 and a printed circuit board 160. According to an exemplary embodiment, the press sensor 130 may be disposed between the printed circuit board 160 and a casing 170 as show in FIG. 3B.

The press sensor 130 may be implemented by using a physical button or a pressure sensor. As shown in FIGS. 3A and 3B, the press sensor 130 may be disposed on each corner and a center of the touch screen panel 111. The physical button or pressure sensor may be disposed in other ways.

Figure 4:
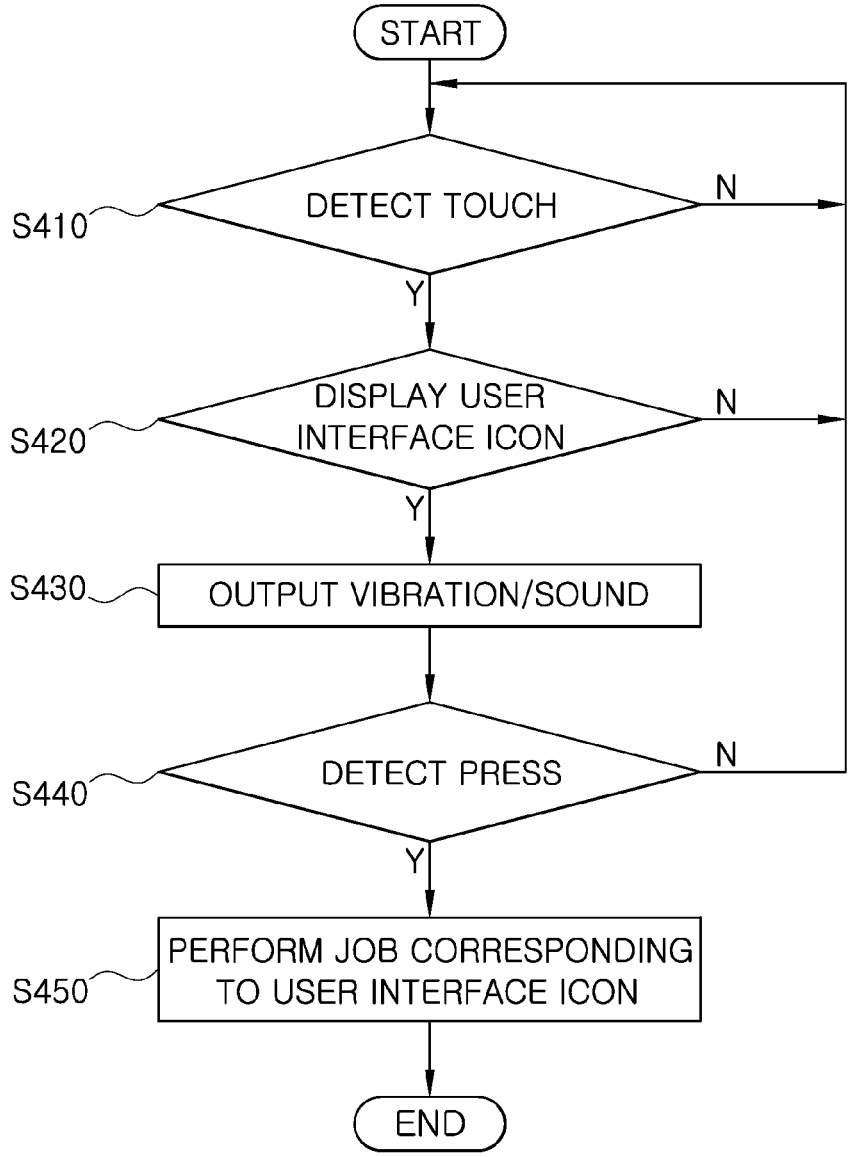
FIG. 4 is a flowchart to illustrate an operation of a touch screen input processing system according to an exemplary embodiment of the present invention.

FIG. 4 is a flowchart to illustrate an operation of a touch screen input processing system according to an exemplary embodiment of the present invention.

Referring to FIGS. 1 and 4, when the touch screen 110 detects a touch on the touch screen panel 111 (S410-Y), the controller 150 of the touch screen input processing system 100 determines whether the touch is detected where a user interface icon is displayed (S420).

When the touch is detected where the user interface icon is displayed (S420-Y), the controller 150 controls the outputter 120 to output at least one of a vibration and a sound corresponding to the touched user interface icon (S430). In operation S430, the same vibration and sound may be output without distinction of the user interface icons. This operation enables the user to recognize that the user just touches the location where the user interface icon is displayed in the touch screen panel 111. According to an exemplary embodiment, the vibration and the sound may be set differently according to each user interface icon. For example, when the user touches a user interface icon for inputting a number or a character, a corresponding sound may be output, and, when the user touches an icon for executing a specific application, a name of the application may be output as a voice. In the case of a number icon, the number of vibrations may beset differently according to a number, so that the user can easily distinguish numbers.

When the touch is detected (S410) and pressing of the touch screen panel 111 by more than a predetermined strength is detected by the press sensor 130 (S440-Y), the controller 150 controls the touch screen input processing system 100 to perform a job corresponding to the user interface icon displayed on the location where the touch is detected (S450). Operation S450 may be performed when only one of the plurality of physical buttons or pressure sensors as shown in FIGS. 3A and 3B detects the press.

According to an exemplary embodiment, operation 450 may be performed only when the touch screen panel 111 being pressed by more than the predetermined strength is detected by the press sensor 130 within a predetermined time after the touch is detected. Alternatively, operation 450 may be performed when the touch screen panel 111 is pressed by more than the predetermined strength while the user interface icon is touched.

Figure 5:
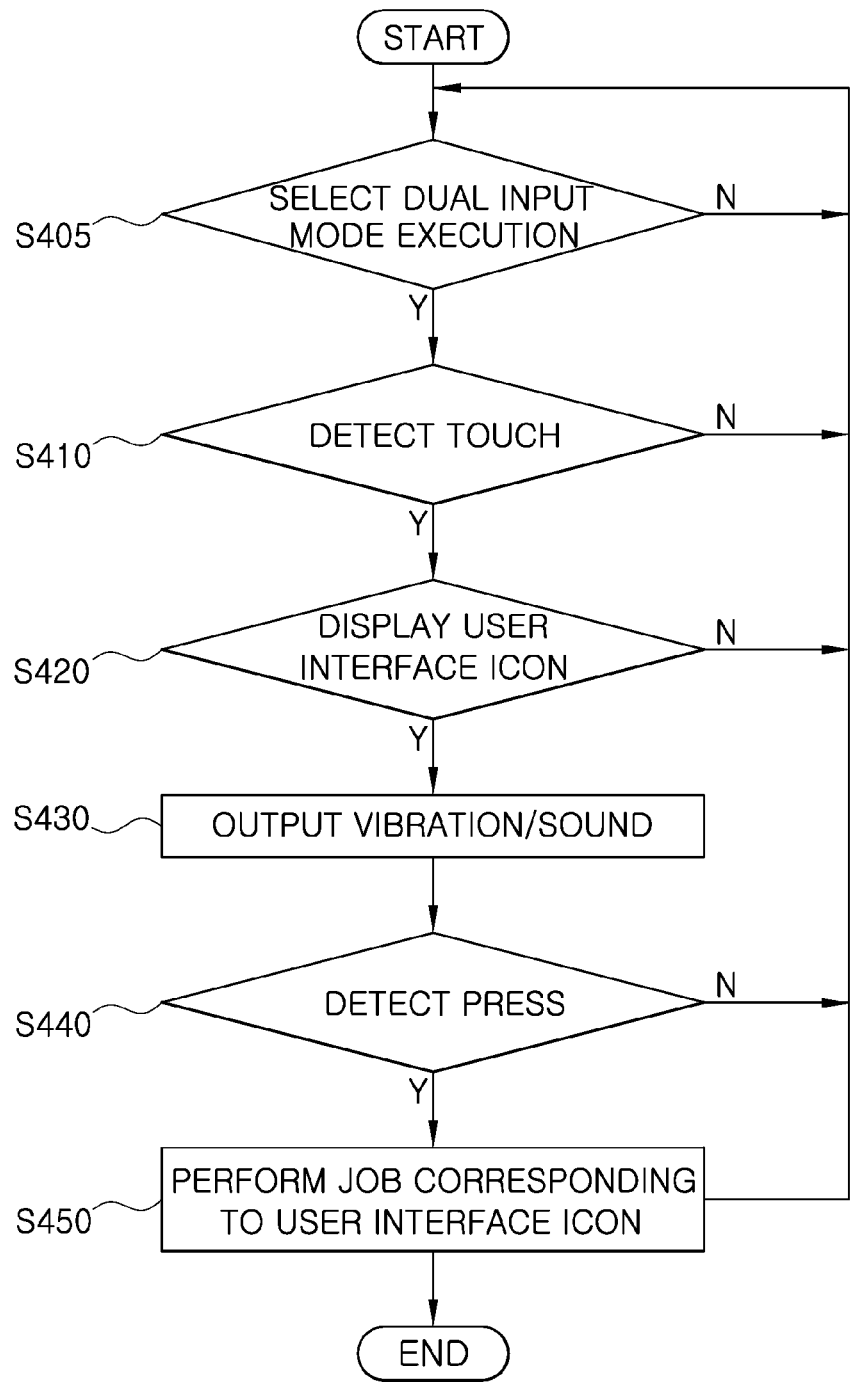
FIG. 5 is a flowchart to illustrate an operation of a touch screen input processing system according to another exemplary embodiment of the present invention.

FIG. 5 is a flowchart to illustrate an operation of a touch screen input processing system according to another exemplary embodiment.

Referring to FIGS. 1 and 5, the operation may further include an operation of determining whether to execute a dual input mode (S405) prior to performing operations S410 to 450 described in FIG. 4. When the dual input mode execution is selected (S405-Y), operations S410 to 450 may be performed.

Operation S405 of determining whether to execute the dual input mode may be performed by the following processes. First, when a touch on the touch screen panel 111 is detected in a standby state in which a touch is not detected for a predetermined time, the controller 150 may control the outputter 120 to output a message inquiring whether to execute the dual input mode. When pressing of the touch screen panel 111 by more than a predetermined strength is detected by the press sensor 130, the controller 150 determines whether the dual input mode execution is selected.

Of course, it may be determined whether to execute the dual input mode in other methods. When the touch screen panel 111 is touched in the standby state and the touch is maintained for a predetermined time or when a touch on the touch screen panel 111 and a press on the touch screen pane 111 by more than a predetermined strength are detected at the same time in the standby state, it may be determined that the dual input mode execution is selected.

When security such as an input of a password is needed, operation S430 of outputting the at least one of the vibration and the sound corresponding to the user interface icon may be performed limitedly as follows.

Figure 6:
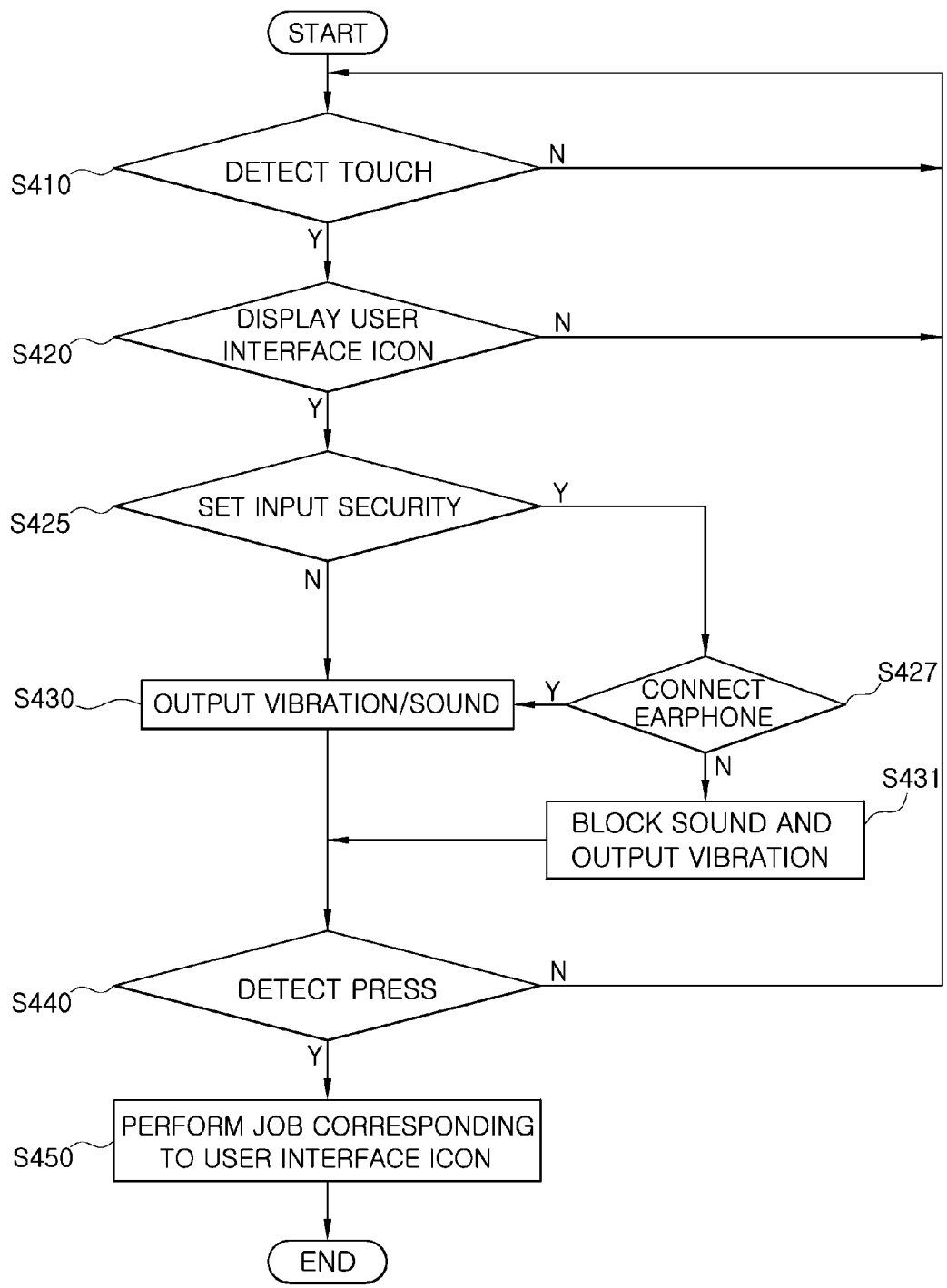
FIG. 6 is a flowchart to illustrate an operation of a touch screen input processing system according to still another exemplary embodiment of the present invention.

FIG. 6 is a flowchart to illustrate an operation of a touch screen input processing system according to still another exemplary embodiment of the present invention.

Referring to FIG. 6, when a touch on the touch screen panel 111 is detected by the touch screen 110 (S410-Y), the controller 150 determines whether the touch is detected where a user interface icon is displayed (S420).

Next, the controller 150 determines whether security is set for an input through the user interface icon on the location where the touch is detected (S425). For example, in the case of an ATM, security may be set for an input through a user interface icon for receiving an account number or a password from the user.

Thereafter, when the security is set for the input through the corresponding icon (S425-Y), the controller 150 controls the outputter 120 to block the output of the sound and output only the vibration (S431). When the security is set for the input but it is determined that an earphone is connected (S427-Y), the controller 150 does not perform operation S431 and may control the ouputter 120 to output at least one of the vibration and the sound corresponding to the touched user interface icon as previously set (S430).

After performing operation S430 or S431, operations 440 and 450 are performed as in the example of FIG. 4.

The exemplary embodiments of the present invention include a computer-readable medium including a program command for performing operations implemented by various computers. This medium records a program for performing the above-described touch screen input processing method. This medium may include a program command, a data file, a data structure, etc. separately or in combination. An example of this medium may include a magnetic medium such as a hard disk, a floppy disk, and a magnetic tape, an optical recording medium such as a Compact Disk (CD) and a Digital Versatile Disk (DVD), and a hardware device configured to store and execute a program command, such as a floptical disk and a magnetic-optical medium, a Read Only Memory (ROM), a Random Access Memory (RAM), and a flash memory. In addition, this medium may be a transmitting medium of light including a carrier wave for transmitting a signal designating a program command, a data structure, etc., a metal wire, a waveguide, etc. An example of the program command includes not only a mechanical code created by a compiler but also a high level language code executable by a computer by using an interpretable.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for processing a touch input via a touch screen panel, the method comprising:
   determining whether to execute a dual input mode, including
   detecting a touch on the touch screen panel in a standby state;
   outputting a message inquiring whether to execute the dual input mode; and
   when the touch screen panel is pressed by more than a predetermined strength, determining that the dual input mode execution is selected, and performing
   (a) detecting another touch on the touch screen panel;
   (b) when the another touch is detected where a user interface icon is displayed, outputting at least one of a vibration and a sound corresponding to the user interface icon; and
   (c) when the touch screen panel is pressed by more than a predetermined strength within a predetermined time after the another touch is detected, performing a job corresponding to the user interface icon displayed on the location where the another touch is detected.

2. The method of claim 1, wherein the vibration and the sound are set differently according to each user interface icon.

3. The method of claim 1, wherein the operation (b) comprises, when security is set for an input through the user interface icon, blocking the output of the sound and outputting only the vibration.

4. A system for processing a touch input, the system comprising:
   a touch screen configured to detect a touch on a touch screen panel;
   an outputter configured to output at least one of a vibration and a sound;
   a press sensor configured to detect user's pressing the touch screen panel by more than a predetermined strength; and
   a controller configured to,
   determine whether dual input mode execution is selected by a user by determining whether the touch screen panel is pressed by more than the predetermined strength, and
   when the touch is detected where a user interface icon is displayed,
   when the dual input mode execution is not selected by the user, directly perform a job corresponding to the user interface icon, and
   when the dual input mode execution is selected by the user,
   control the outputter to output at least one of the vibration and the sound corresponding to the user interface icon, and,
   when a press on the touch screen panel is detected within a predetermined time after the touch is detected by more than the predetermined strength, perform a job corresponding to the user interface icon of location where the touch is detected.

5. The system of claim 4, wherein the vibration and the sound are set differently according to each user interface icon.

6. The system of claim 4, wherein, when the touch is detected in a standby state, the controller outputs a message inquiring whether to execute the dual input mode.

7. The system of claim 4, wherein, when an input through the user interface icon has security set therefor, the controller outputs only the vibration corresponding to the user interface icon.

8. The system of claim 4, wherein the press sensor comprises a physical button which is disposed on a lower portion of the touch screen panel.

9. The system of claim 4, wherein the press sensor comprises a pressure sensor which is disposed on a lower portion of the touch screen panel.

10. A non-transitory computer readable medium recording a program for executing the method of claim 1 in a computer.

* * * * *